(12) United States Patent
Flamm et al.

(10) Patent No.: US 12,053,838 B2
(45) Date of Patent: Aug. 6, 2024

(54) APPARATUS AND METHOD FOR LASER MACHINING A WORKPIECE

(71) Applicant: TRUMPF Laser- und Systemtechnik GmbH, Ditzingen (DE)

(72) Inventors: Daniel Flamm, Ludwigsburg (DE); Michael Jenne, Ditzingen (DE); Henning Heiming, Reken (DE)

(73) Assignee: TRUMPF LASER- UND SYSTEMTECHNIK GMBH, Ditzingen (DE)

( * ) Notice: Subject to any disclaimer, the term of this patent is extended or adjusted under 35 U.S.C. 154(b) by 0 days.

(21) Appl. No.: 18/357,186

(22) Filed: Jul. 24, 2023

(65) Prior Publication Data
US 2023/0364708 A1 Nov. 16, 2023

Related U.S. Application Data

(63) Continuation of application No. PCT/EP2021/087159, filed on Dec. 21, 2021.

(30) Foreign Application Priority Data

Jan. 26, 2021 (DE) ...................... 10 2021 101 598.7

(51) Int. Cl.
*B23K 26/067* (2006.01)
*B23K 26/0622* (2014.01)
*B23K 26/064* (2014.01)

(52) U.S. Cl.
CPC ...... *B23K 26/0673* (2013.01); *B23K 26/0622* (2015.10); *B23K 26/064* (2015.10)

(58) Field of Classification Search
CPC ............ B23K 26/0738; B23K 26/0676; B23K 26/0648; B23K 26/0608; B23K 26/0652;
(Continued)

(56) References Cited

U.S. PATENT DOCUMENTS 5,059,013 A 10/1991 Jain
5,719,667 A 2/1998 Miers
(Continued)

FOREIGN PATENT DOCUMENTS

DE 102014116958 A1 5/2016
DE 102020207715 A1 12/2021
(Continued)

OTHER PUBLICATIONS

Daniel Flamm et al, "Beam shaping for ultrafast materials processing," Proceedings vol. 10904, Laser Resonators, Microresonators, and Beam Control XXI; 109041G (2019), Mar. 4, 2019, pp. 1-17, SPIE, Bellingham, WA USA.
(Continued)

*Primary Examiner* — Chris Q Liu
(74) *Attorney, Agent, or Firm* — Leydig, Voit & Mayer, Ltd.

(57) ABSTRACT

An apparatus for laser machining a workpiece includes a beam shaping device for forming a focal zone from an input laser beam incident on the beam shaping device, and a telescope device for imaging the focal zone into a material of the workpiece. The beam shaping device is configured to impose a phase on a beam cross section of the input laser beam in such a way that the focal zone extends along a longitudinal centre axis which is curved at least in certain portions. The telescope device is assigned a beam splitting device for splitting an output laser beam output coupled from the beam shaping device into a plurality of polarized partial beams, each of which has one of at least two different polarization states. The focal zone has an asymmetrical cross section in a plane oriented perpendicular to the longitudinal centre axis.

18 Claims, 13 Drawing Sheets

(58) Field of Classification Search
CPC ............ B23K 26/0732; B23K 26/0006; B23K 26/0604; B23K 26/0643; B23K 26/04; B23K 26/40; B23K 26/043; B23K 26/0617; B23K 26/0624; B23K 26/064; B23K 26/0665; B23K 26/082; B23K 26/083; B23K 26/352; B23K 26/354; B23K 26/36; B23K 26/361; B23K 26/53; B23K 26/702; B23K 26/02; B23K 26/034; B23K 26/037; B23K 26/06; B23K 26/0613; B23K 26/0622; B23K 26/066; B23K 26/067; B23K 26/08; B23K 26/0821; B23K 26/0823; B23K 26/0846; B23K 26/0869; B23K 26/0884; B23K 26/123; B23K 26/211; B23K 26/26; B23K 26/362; B23K 26/364; B23K 26/38; B23K 26/382; B23K 26/402; B23K 26/55; B23K 26/60
USPC .............. 219/121.65, 121.73, 121.6, 121.66, 219/121.74, 121.75, 121.83
See application file for complete search history.

(56) References Cited

U.S. PATENT DOCUMENTS

| | | | | |
|---|---|---|---|---|
| 5,796,521 | A * | 8/1998 | Kahlert | G02B 27/0966 359/619 |
| 5,825,551 | A * | 10/1998 | Clarkson | G02B 19/0057 359/857 |
| 6,341,042 | B1 * | 1/2002 | Matsunaka | B23K 26/0643 362/268 |
| 6,765,725 | B1 * | 7/2004 | Fermann | G02B 19/0028 359/636 |
| 9,757,815 | B2 | 9/2017 | Hosseini | |
| 10,173,916 | B2 | 1/2019 | Bankaitis et al. | |
| 2001/0012651 | A1 * | 8/2001 | Yamazaki | G02B 27/0977 438/166 |
| 2002/0163730 | A1 * | 11/2002 | Sugiyama | G02B 1/12 359/618 |
| 2003/0128543 | A1 * | 7/2003 | Rekow | G02B 19/0057 362/333 |
| 2005/0006361 | A1 * | 1/2005 | Kobayashi | B23K 26/0676 219/121.75 |
| 2006/0202115 | A1 * | 9/2006 | Lizotte | B23K 26/04 250/234 |
| 2007/0268572 | A1 * | 11/2007 | Hu | G02B 19/0057 372/50.23 |
| 2008/0030876 | A1 * | 2/2008 | Kataoka | B23K 26/032 425/106 |
| 2011/0157706 | A1 * | 6/2011 | Mitra | G02B 27/0927 359/639 |
| 2012/0057345 | A1 * | 3/2012 | Kuchibhotla | G02B 19/0057 362/237 |
| 2017/0008793 | A1 | 1/2017 | Bankaitis et al. | |
| 2017/0203994 | A1 | 7/2017 | Chen et al. | |
| 2017/0219835 | A1 * | 8/2017 | Zambuto | G02B 27/30 |
| 2017/0276951 | A1 * | 9/2017 | Kumkar | B23K 26/066 |
| 2018/0093914 | A1 | 4/2018 | Akarapu et al. | |
| 2020/0147729 | A1 | 5/2020 | Chang et al. | |
| 2021/0001430 | A1 | 1/2021 | Ungaro | |
| 2022/0032398 | A1 | 2/2022 | Kumkar et al. | |
| 2023/0182234 | A1 | 6/2023 | Flamm et al. | |

FOREIGN PATENT DOCUMENTS

| | | |
|---|---|---|
| EP | 0822404 B1 | 6/2009 |
| EP | 2859984 B1 | 2/2019 |
| JP | 2009178725 A | 8/2009 |
| WO | WO 2005032757 A1 | 4/2005 |
| WO | WO 2009157319 A1 | 12/2009 |
| WO | WO 2015095089 A2 | 6/2015 |
| WO | WO 2020212175 A1 | 10/2020 |

OTHER PUBLICATIONS

F. Courvoisier et al, "Ultrafast laser micro and nano processing with nondiffracting and curved beams," Optics and Laser Technology, Jun. 2016, pp. 125-137, vol. 80, Elsevier, Amsterdam, Netherlands.
Ioannis D. Chremmos et al, "Bessel-like optical beams with arbitrary trajectories," Optics Letters, Dec. 2012, pp. 5003-5005, vol. 37, Issue 23, Optica Publishing Group, Washington, DC, USA.
Keyou Chen et al, "Generalized axicon-based generation of nondiffracting beams," arXiv:1911.03103 [physics.optics], Nov. 2019, pp. 1-4, Cornell Univeristy, Ithaca, New York, USA.
Michael Jenne et al, "High-quality tailored-edge cleaving using aberration-corrected Bessel-like beams," Optics Letters, Jul. 2018, pp. 3013-3199, vol. 43, Issue 13, Optica Publishing Group, Washington, DC, USA.

* cited by examiner

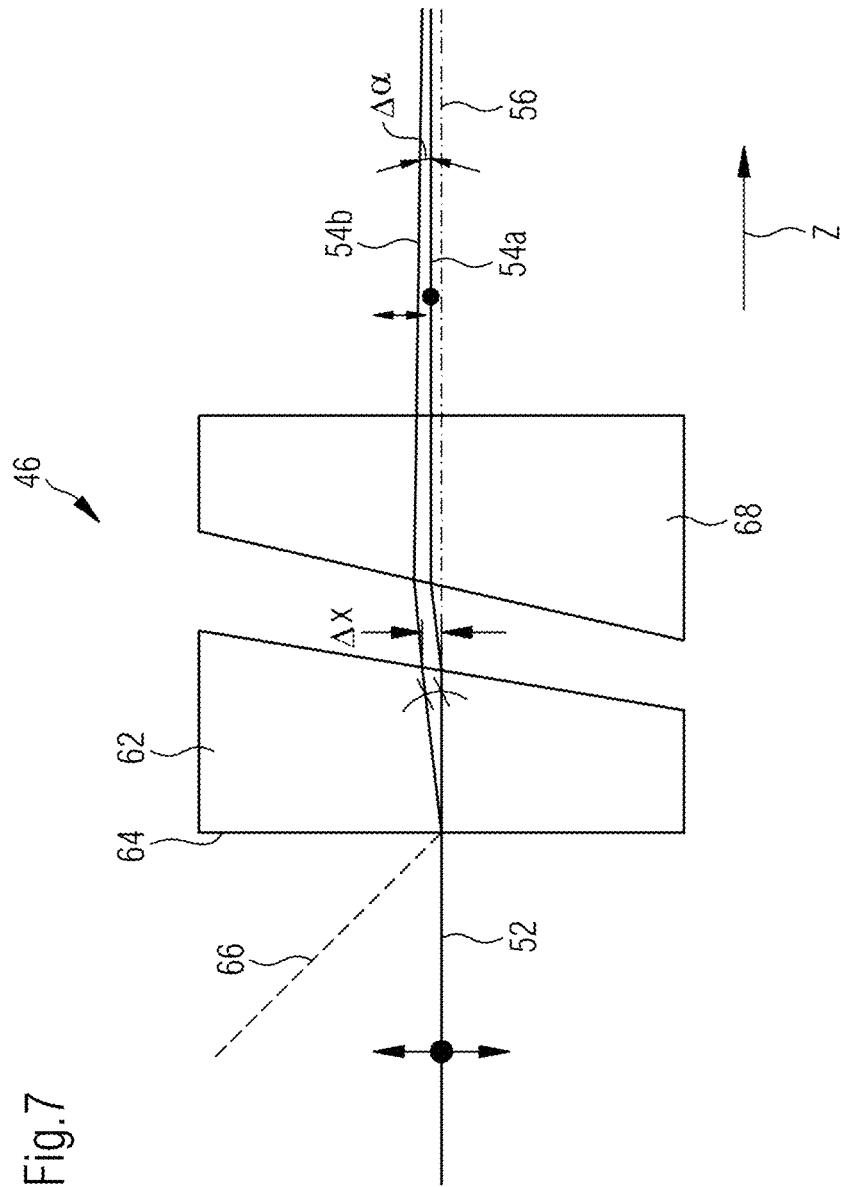

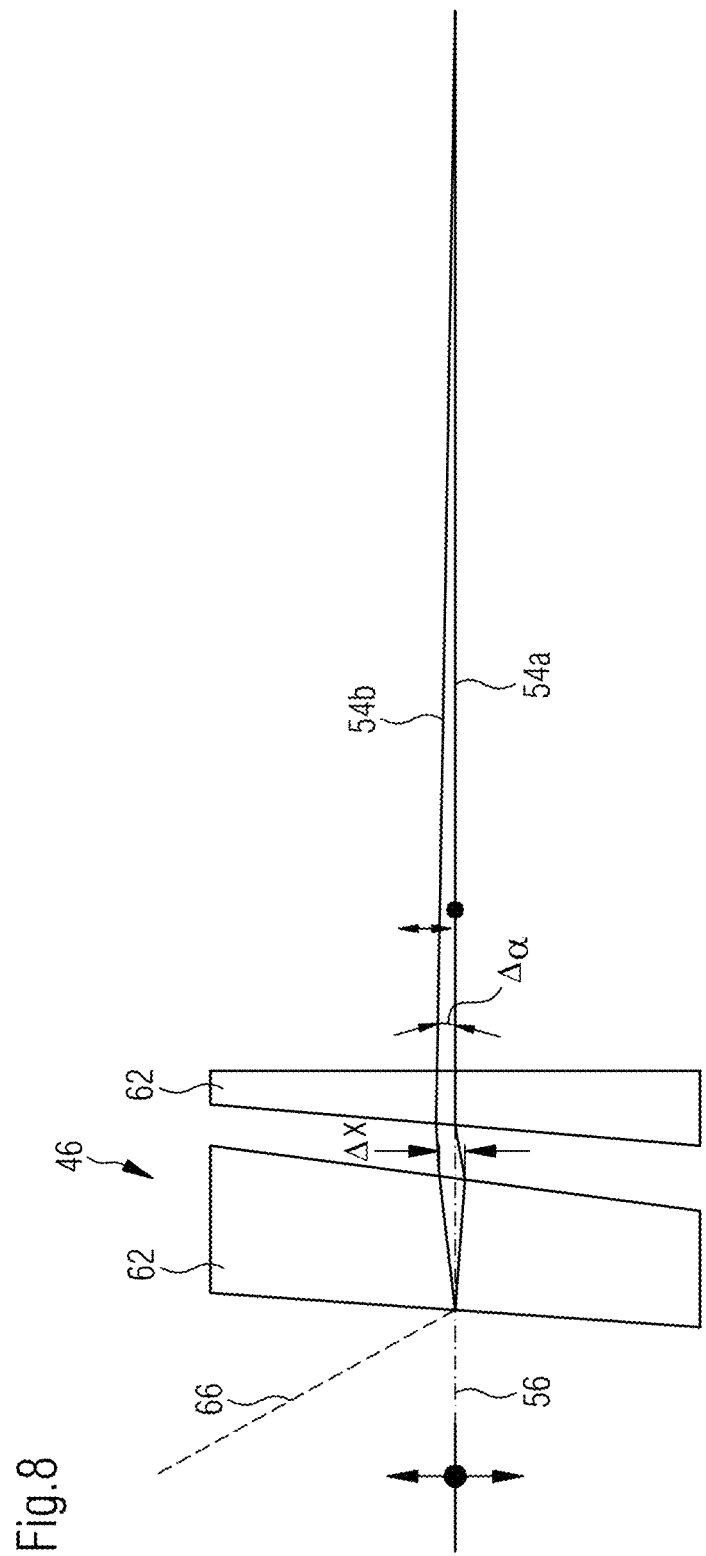

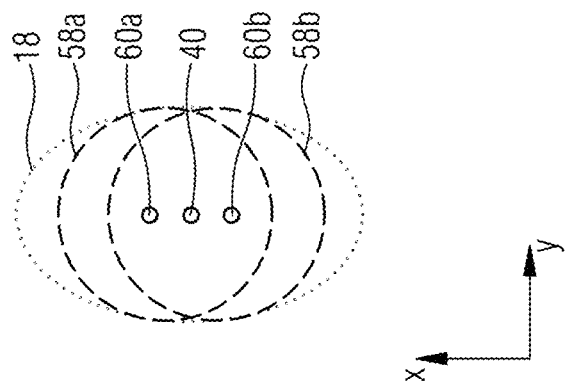
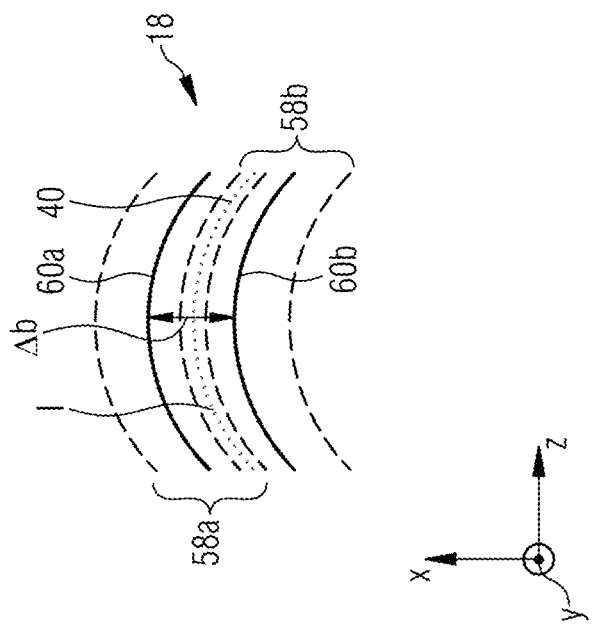

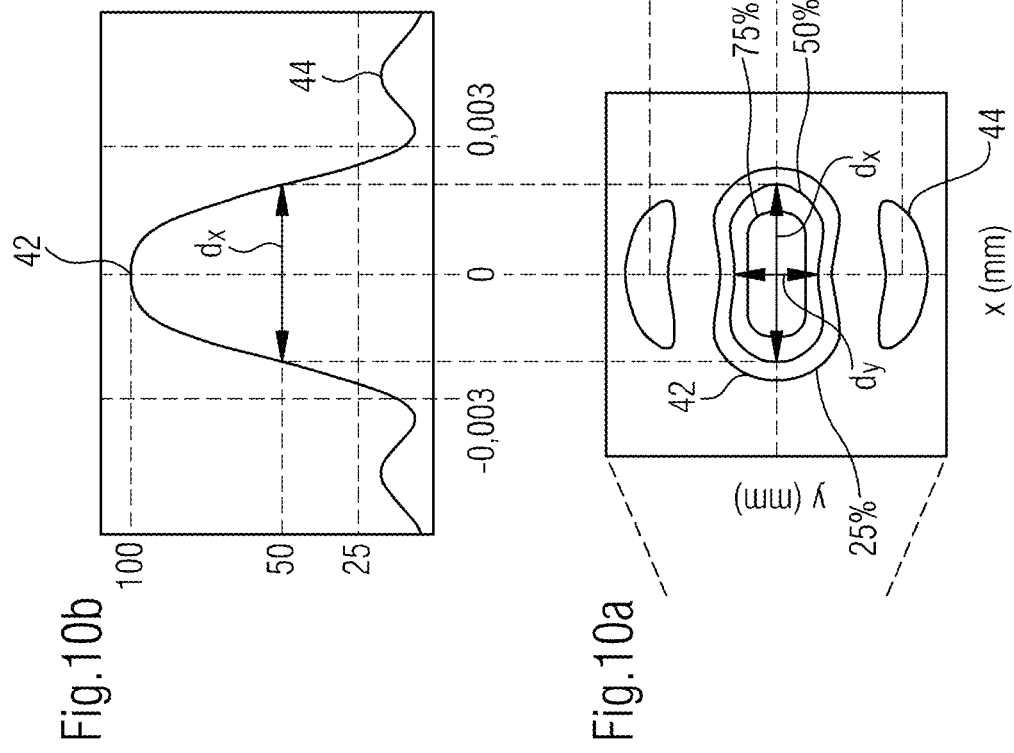

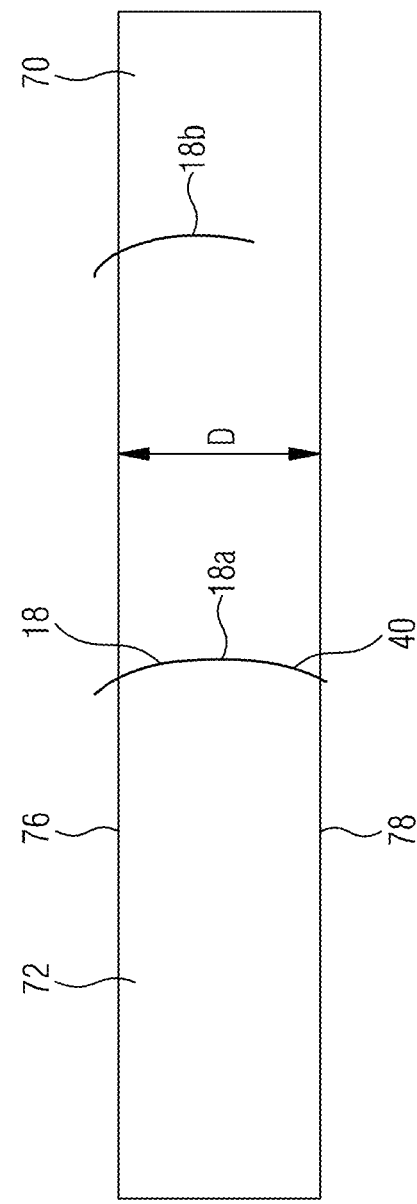

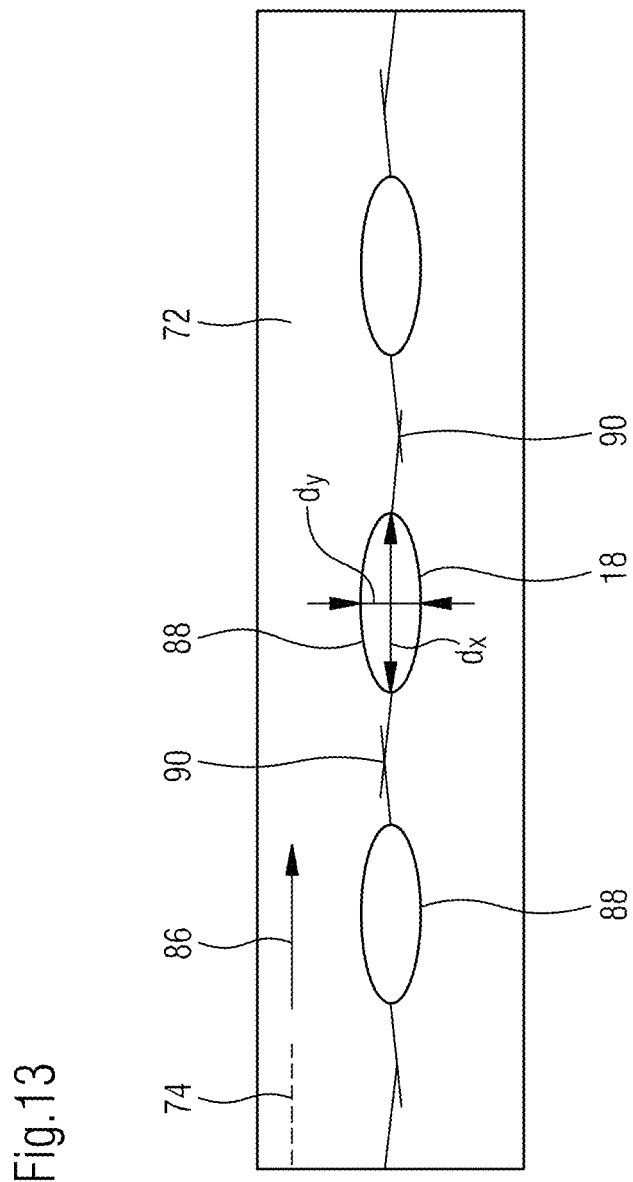

APPARATUS AND METHOD FOR LASER MACHINING A WORKPIECE

CROSS REFERENCE TO RELATED APPLICATIONS

This application is a continuation of International Application No. PCT/EP2021/087159, filed on Dec. 21, 2021, and claims benefit to German Patent Application No. DE 10 2021 101 598.7, filed on Jan. 26, 2021. The aforementioned applications are hereby incorporated by reference herein.

FIELD

Embodiments of the present invention relate to an apparatus for laser machining a workpiece.

Embodiments of the present invention also relate to a method for laser machining a workpiece.

BACKGROUND

EP 2 859 984 B1 discloses a method for laser machining a transparent material, in the course of which a laser beam containing a burst of laser pulses is provided, and pulses of the laser beam are focussed, wherein the focussing is carried out by means of one or more optical elements with attendant aberration, in order to form a beam waist at a location which is outside the transparent material, in order to generate a dispersed focus along a longitudinal axis of the laser beam within the transparent material, and wherein the focussed laser beam has a sufficient energy density within the transparent material to form and maintain a continuous laser filament within it, wherein the laser energy deposited along the continuous laser filament leads to an internal modification of the material, wherein the internal modification has a shape defined by the continuous filament.

U.S. Pat. No. 10,173,916 B2 discloses a method for bevelling and/or chamfering an edge of a glass substrate using lasers.

US 2020/0147729 A1 discloses a cutting method for forming a chamfered corner by means of different light patterns on the basis of Gaussian beams.

SUMMARY

Embodiments of the present invention provide an apparatus for laser machining a workpiece. The apparatus includes a beam shaping device for forming a focal zone from an input laser beam incident on the beam shaping device, and a telescope device for imaging the focal zone into a material of the workpiece. The beam shaping device is configured to impose a phase on a beam cross section of the input laser beam in such a way that the focal zone extends along a longitudinal centre axis which is curved at least in certain portions. The telescope device is assigned a beam splitting device for splitting an output laser beam output coupled from the beam shaping device into a plurality of polarized partial beams, each of which has one of at least two different polarization states. The telescope device with the beam splitting device is designed to focus the plurality of polarized partial beams into a first partial focal zone of first partial beams having a first polarization state and a second partial focal zone of second partial beams having a second polarization state, so that the focal zone at least in certain portions is formed by a spatial overlap of the first partial focal zone and the second partial focal zone, and the focal zone has an asymmetrical cross section in a plane oriented perpendicular to the longitudinal centre axis. The beam splitting device includes a birefringent polarizer element, so that both a spatial offset and an angular offset are created between the first partial beams and the second partial beams output coupled from the beam splitting device. The first partial beams output coupled from the beam splitting device are oriented parallel to an optical axis of the telescope device.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 7 shows a schematic sectional illustration of a first embodiment of a beam splitting device;

FIG. 8 shows a schematic sectional illustration of a further embodiment of a beam splitting device;

FIG. 9a shows a schematic illustration of a focal zone in a cross section parallel to a longitudinal centre axis of a focal zone, wherein the focal zone is formed by spatial overlap of a first partial focal zone and a second partial focal zone;

FIG. 9b shows a schematic cross-sectional illustration of the focal zone according to FIG. 9a in an x-y plane oriented perpendicularly in relation to a longitudinal centre axis of the focal zone;

FIG. 10a shows a schematic cross-sectional illustration of an intensity distribution of a focal zone in an x-y plane oriented perpendicularly in relation to a longitudinal centre axis of the focal zone;

FIG. 10b shows an intensity distribution of the focal zone according to FIG. 10a in the x direction at y=0;

FIG. 10c shows an intensity distribution of the focal zone according to FIG. 10a in the y direction at x=0;

FIG. 11 shows a schematic sectional illustration of a workpiece which is machined by means of a focal zone along a machining line and/or machining surface;

FIG. 13 shows a schematic sectional illustration of a partial region of the workpiece on a machining line and/or machining surface, wherein cracks are formed between mutually spaced apart modification regions.

DETAILED DESCRIPTION

Figure 1:
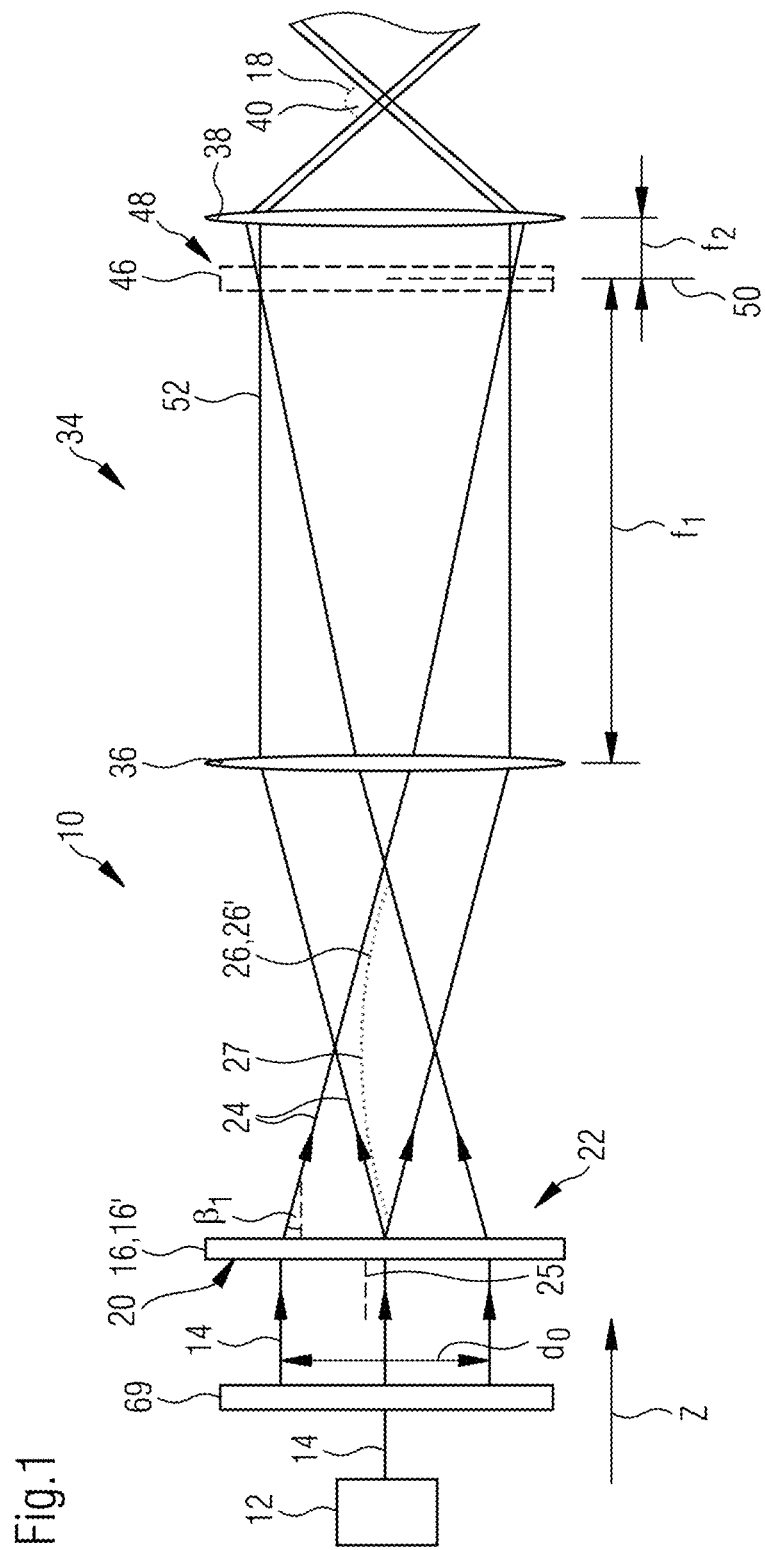
FIG. 1 shows a schematic sectional illustration of one embodiment of an apparatus for laser machining a workpiece, with two different variants being indicated.

Embodiments of the present invention provide an apparatus, by means of which it is possible to laser machine a workpiece along a curved machining line in a technically simple way.

According to embodiments of the invention, the apparatus comprises a beam shaping device for forming a focal zone from an input laser beam incident on the beam shaping device, and a telescope device for imaging the focal zone into a material of the workpiece, wherein the beam shaping device is used to impose a phase on a beam cross section of the input laser beam in such a way that the focal zone extends along a longitudinal centre axis which is curved at least in certain portions and in that the focal zone has an asymmetrical cross section in a plane oriented perpendicularly in relation to the longitudinal centre axis.

The beam shaping device makes it possible to realize the focal zone mentioned by correspondingly imposing a phase on the beam cross section of the input laser beam in a technically simple way and with a low number of components.

In particular, the focal zone forms an interaction region, wherein the application of this interaction region to a material of the workpiece makes it possible to form localized material modifications, which in particular make it possible to separate the material.

Since the focal zone extends along a longitudinal centre axis which is curved at least in certain portions, it is possible for example to machine on the workpiece a region that is curved at least in certain portions in a single pass and/or without utilizing an optical unit. This makes it possible for example to modify a rounded region on the workpiece and/or separate it from the workpiece. For example, as a result it is possible to round an edge region of the workpiece.

The asymmetrical cross section of the focal zone makes it possible to control and/or optimize the formation of cracks between modification regions which are adjacent to one another in the advancement direction. In particular, this makes it possible to align cracks at least approximately parallel to a shortest connection line between adjoining modification regions. This makes it possible to achieve optimized separation of the workpiece.

In particular, it may be provided that a phase distribution of partial beams output coupled on a beam exit side of the beam shaping device is non-continuous and/or has points of discontinuity. This makes it possible to create a focal zone with an asymmetrical cross section by interference, and in particular by not completely constructive interference, of the output-coupled partial beams.

An asymmetrical cross section is to be understood in particular to mean that a diameter of a beam and/or of a focal zone has different diameters in the x direction and y direction, wherein the x direction and the y direction are in particular oriented perpendicularly in relation to one another and/or lie in a plane oriented perpendicularly in relation to a beam propagation direction.

To determine spatial dimensions of the focal zone, such as a length and/or a diameter of the focal zone, the focal zone is observed in a modified intensity distribution which only has intensity values that are above a determined intensity threshold, wherein the intensity threshold is in particular 50% of an overall intensity maximum of the actual intensity distribution. A length of the focal zone, or a diameter of the focal zone, is to be understood to mean a maximum length of extent and/or a length of maximum extent of the focal zone along the longitudinal centre axis of the focal zone, or in a plane oriented perpendicularly in relation to the longitudinal centre axis, taken on the basis of the modified intensity distribution.

In particular, the longitudinal centre axis of the focal zone is curved and/or continuously curved and/or curved over an entire length of the focal zone.

According to embodiments of the invention, an apparatus comprises a beam shaping device for forming a focal zone from an input laser beam incident on the beam shaping device and a telescope device is used to image the focal zone into a material of the workpiece, wherein the beam shaping device is used to impose a phase on a beam cross section of the input laser beam in such a way that the focal zone extends along a longitudinal centre axis which is curved at least in certain portions, wherein the telescope device is assigned a beam splitting device for splitting partial beams output coupled from the beam shaping device into a plurality of polarized partial beams, each of which has one of at least two different polarization states, wherein the telescope device with the beam splitting device is designed to focus the polarized partial beams into a first partial focal zone of first partial beams having the first polarization state and a second partial focal zone of second partial beams having the second polarization state, with the result that the focal zone at least in certain portions is formed by spatial overlap of the first partial focal zone and the second partial focal zone, and the focal zone has an asymmetrical cross section in a plane oriented perpendicularly in relation to the longitudinal centre axis.

In this variant of an embodiment of the invention, the asymmetrical cross section of the focal zone is realized by splitting beams using the beam splitting device. As a result, the focal zone is in particular formed by incoherent overlap and/or superposition of first partial beams having the first polarization state and second partial beams having the second polarization state.

It is in principle also possible that partial beams having more than two different polarization states are formed by means of the beam splitting device and/or that the focal zone is formed from more than two different partial focal zones.

Overlapping is understood to mean in particular at least partial spatial overlay, this being used in particular for the addition of intensities of the first partial focal zone and the second partial focal zone.

Partial beams having different polarization states are in particular to be understood to mean linearly polarized partial beams, with in particular polarization directions of first partial beams having the first polarization state and of second partial beams having the second polarization state being aligned at an angle of 90° in relation to one another.

In particular, it may be provided that the focal zone at least in certain portions is formed by the overlap of a spatial intensity distribution of the first partial focal zone and of the second partial focal zone. This makes it possible to form a focal zone with an asymmetrical cross section in a technically simple way.

In principle, it is also possible that the focal zone is formed completely by spatial overlap of the first partial focal zone and the second partial focal zone.

It can be expedient when the first partial focal zone extends along a first longitudinal centre axis and the second partial focal zone extends along a second longitudinal centre axis, wherein the first longitudinal centre axis and the second longitudinal centre axis each have a curved form at least in certain portions. This makes it possible to form the focal zone with a curved shape and asymmetrical cross section.

For the same reason, it can be advantageous when the first longitudinal centre axis and the second longitudinal centre axis have a spatial offset in a direction oriented perpendicularly in relation to the first longitudinal centre axis and/or the second longitudinal centre axis.

For the same reason, it can be expedient when the first longitudinal centre axis and the second longitudinal centre axis run at least approximately parallel to one another.

In particular, it may be provided that the first partial beams and the second partial beams are incoherent in relation to one another and/or that the first partial beams and the second partial beams do not have a fixed phase relationship with one another. As a result, the focal zone is in particular formed by incoherent overlap and/or superposition of the first partial beams and second partial beams.

In particular, it may be provided that the beam splitting device is disposed in a far field region of the telescope device and/or that the beam splitting device is arranged at least approximately in a focal plane of the telescope device. As a result, the beam splitting device can be integrated in the telescope device in a technically simple way.

A far field region is understood in particular to mean a region within a beam path of the telescope device in which there is an annular intensity distribution about an optical axis of the telescope device.

In particular, it may be provided that the telescope device has a first lens element and a second lens element which is spaced apart from the first lens element in the beam propagation direction, wherein the beam splitting device is disposed between the first lens element and the second lens element, and/or wherein the beam splitting device is disposed at least approximately in a focal plane of the first lens element and/or of the second lens element.

In particular, it may be provided that the beam splitting device is or comprises a beam splitter optical unit and in particular a polarization beam splitter optical unit. For example, the beam splitter optical unit is produced from a quartz crystal or comprises a quartz crystal.

For example, the beam splitting device has at least one birefringent element and in particular at least one birefringent wedge element.

It can be advantageous when the beam splitting device has a birefringent polarizer element, by means of which both a spatial offset and an angular offset are created between the first partial beams and second partial beams output coupled from the beam splitting device.

In particular, the beam splitting device comprises a further optical element arranged downstream of the birefringent polarizer element in the longitudinal direction, such as an isotropic element or a further birefringent polarizer element.

In particular, the further optical element is designed to modify the spatial offset and/or the angular offset between the first partial beams and second partial beams output coupled from the beam splitting device.

Preferably, the further optical element is configured to align the first partial beams parallel to the optical axis of the telescope device.

It can be advantageous when the beam splitting device is used to split incident beams into respective different partial beams having different polarization states, wherein partial beams that are output coupled from the beam splitting device and have different polarization states have an angular offset. After the partial beams have been imaged by means of the telescope device, the angular offset results in a spatial offset of the partial beams having different polarization states.

In particular, it may be provided that first partial beams which are output coupled from the beam splitting device and have the first polarization state are oriented parallel to an optical axis of the telescope device. This results in reduced adjustment complexity.

The two abovementioned variants of the apparatus according to embodiments of the invention in particular each have one or more of the features and/or advantages described below.

In particular, it may be provided that the focal zone and/or an intermediate image assigned to the focal zone is formed by interference, and in particular by interference which is constructive in certain portions, of partial beams output coupled from the beam shaping device.

In particular, it may be provided that the telescope device has a first lens element and a second lens element which is spaced apart from the first lens element in the beam propagation direction, wherein the first lens element is used to input couple beams into the telescope device and/or the second lens element is used to output couple beams from the telescope device.

In particular, it may be provided that the telescope device has a first lens element and a second lens element which is spaced apart from the first lens element in the beam propagation direction, wherein the first lens element has a larger focal width than the second lens element.

In one embodiment, the first lens element of the telescope device is integrated in the beam shaping device or disposed on the beam shaping device. In particular, a functionality of the first lens element is integrated in the beam shaping device.

In particular, it may be provided that the longitudinal centre axis of the focal zone at least in certain portions has a radius of curvature of at least 50 µm and/or at most 100 mm, and/or that the longitudinal centre axis of the focal zone has an average radius of curvature of at least 200 µm and/or at most 2 mm.

For example, the focal zone and/or the longitudinal centre axis of the focal zone has a U shape and/or a C shape and/or a hyperbolic shape.

In particular, it may be provided that the focal zone and/or the longitudinal centre axis of the focal zone extends at least approximately along an arcuate portion.

For example, a centre point angle of the arcuate portion is at least 1° and/or at most 90°.

For example, the focal zone and/or the longitudinal centre axis of the focal zone extend along a quarter circle at least in certain portions.

In particular, it may be provided that the focal zone has a spatially contiguous design. In particular, the first partial focal zone and/or the second partial focal zone have a spatially contiguous design.

In particular, the focal zone and/or the longitudinal centre axis of the focal zone have a continuous and/or differentiable shape. In particular, the focal zone and/or the longitudinal centre axis do not have any break points and/or points of discontinuity.

In particular, the focal zone has a line-like and/or elongate and/or long form.

For example, a length of the focal zone is more than 10 times and in particular more than 50 times a greatest diameter of the focal zone.

In particular, it may be provided that the focal zone has a length of at least 50 μm and/or at most 20 mm and in particular of at least 500 μm and/or at most 2 mm.

In particular, it may be provided that a greatest diameter of the focal zone is at least 500 nm and/or at most 5 μm.

It may be expedient when a greatest diameter of the focal zone in a plane oriented perpendicularly in relation to the longitudinal centre axis of the focal zone is at least approximately constant along the longitudinal centre axis. This makes it possible to achieve approximately uniform machining of material over a length of the focal zone.

It may be advantageous when a quasi-nondiffractive and/or Bessel-like beam can be generated or is generated by means of the beam shaping device. As a result, in particular a focal zone with a transverse intensity distribution that is at least approximately constant in the longitudinal direction is provided, wherein a transverse intensity distribution is to be understood to mean an intensity distribution in a plane oriented perpendicularly in relation to the longitudinal centre axis of the focal zone.

In particular, the focal zone has a quasi-nondiffractive and/or Bessel-like beam profile.

Quasi-nondiffractive beams and/or Bessel-like beams should be understood in particular to mean beams for which a transverse intensity distribution is propagation invariant. In particular, a transverse intensity distribution in a longitudinal direction and/or beam propagation direction of the beams is substantially constant in the case of quasi-nondiffractive beams and/or Bessel-like beams.

A transverse intensity distribution should be understood to mean an intensity distribution located in a plane oriented perpendicularly in relation to the longitudinal direction and/or beam propagation direction of the beams.

In terms of the definition and properties of quasi-nondiffractive beams, reference is made to the following book: "Structured Light Fields: Applications in Optical Trapping, Manipulation and Organisation", M. Wördemann, Springer Science & Business Media (2012), ISBN 978-3-642-29322-1.

In terms of the formation and properties of quasi-nondiffractive and/or Bessel-like beams with curved shapes, reference is made to the scientific publication "Bessel-like optical beams with arbitrary trajectories" by I. Chremmos et al., Optics Letters, Vol. 37, no. 23, 1 Dec. 2012.

In terms of the formation and properties of quasi-nondiffractive and/or Bessel-like beams with an asymmetrical cross section, reference is made to the scientific publication "Generalized axicon-based generation of nondiffracting beams" by K. Chen et al., arXiv:1911.03103v1 [physics.optics], 8 Nov. 2019.

In particular, it may be provided that the focal zone has an elliptical cross section in a plane oriented perpendicularly in relation to the longitudinal centre axis of the focal zone. This makes it possible in particular to control the formation of cracks and/or orientation of cracks that are formed during the laser machining of the workpiece.

For the same reason, it may be advantageous when a greatest diameter of a cross-sectional ellipse of the focal zone is aligned at least approximately parallel to an advancement direction, in which the workpiece is moved relative to the focal zone to form a machining line and/or machining surface. As a result, cracks formed during the laser machining in particular are oriented at least approximately parallel to the advancement direction.

In particular, it may be advantageous for an intermediate image of the focal zone to be formed by means of the beam shaping device, wherein the focal zone is formed by imaging the intermediate image by means of the telescope device. The telescope device can be used to adapt in particular a length of the focal zone on the basis of the use.

In particular, it may be provided that the intermediate image is disposed, in the beam propagation direction, between the beam shaping device and a second lens element for output coupling beams from the telescope device and/or between the beam shaping device and a beam splitting device for splitting partial beams output coupled from the beam shaping device into a plurality of polarized partial beams.

It may be advantageous when the beam shaping device and/or the beam splitting device are rotatable relative to an optical axis of the telescope device and in particular about the optical axis of the telescope device. This makes it possible to adapt an alignment of the focal zone relative to the workpiece.

In particular, it may be provided that the apparatus comprises a laser source for providing the input laser beam, wherein in particular a pulsed laser beam or an ultrashort pulse laser beam is provided by means of the laser source.

For example, a wavelength of the input laser beam is at least 300 nm and/or at most 1500 nm. For example, the wavelength is 515 nm or 1030 nm.

In particular, the machining beam has a mean power of at least 1 W to 1 kW. For example, the machining beam comprises pulses with a pulse energy of at least 100 and/or at most 50 mJ. It may be provided that the machining beam comprises individual pulses or bursts, with the bursts having 2 to 20 subpulses and in particular a time interval of approximately 20 ns.

It can be advantageous when the beam shaping device has at least one diffractive optical element or is in the form of a diffractive optical element.

In principle, it is also possible for the beam shaping device to be in the form of a refractive and/or reflective optical element.

For example, the beam shaping device is or comprises an axicon-like element.

It may be advantageous when a phase distribution of partial beams output coupled on a beam exit side of the beam shaping device is asymmetrical and/or not rotationally symmetrical. In particular, the phase distribution is asymmetrical and/or not rotationally symmetrical with respect to a beam axis of the input laser beam and/or with respect to an optical axis of the beam shaping device. This makes it possible to generate the focal zone for example in the form of a curved Bessel-like beam and/or accelerated Bessel-like beam.

It may be expedient when the apparatus comprises a further telescope device for controlling a diameter of the input laser beam incident on the beam shaping device. This makes it possible to control and/or regulate a length of the focal zone.

For example, the further telescope device is disposed upstream of the beam shaping device in the beam propagation direction.

According to embodiments of the invention, a method for laser machining a workpiece is provided, in the course of which a beam shaping device is used to form a focal zone from an input laser beam incident on the beam shaping device, wherein the focal zone is imaged or can be imaged into a material of the workpiece by means of a telescope device, and wherein the beam shaping device is used to impose a phase on a beam cross section of the input laser beam in such a way that the focal zone extends along a longitudinal centre axis which is curved at least in certain portions and that the focal zone has an asymmetrical cross section in a plane oriented perpendicularly in relation to the longitudinal centre axis.

According to embodiments of the invention, a further method for laser machining a workpiece is provided, in the course of which a beam shaping device is used to form a focal zone from an input laser beam incident on the beam shaping device, wherein the focal zone is imaged or can be imaged into a material of the workpiece by means of a telescope device, the beam shaping device is used to impose a phase on a beam cross section of the input laser beam in such a way that the focal zone extends along a longitudinal centre axis which is curved at least in certain portions, a beam splitting device assigned to the telescope device is used to split partial beams output coupled from the beam shaping device into a plurality of polarized partial beams, each of which has one of at least two different polarization states, the polarized partial beams are focussed into a first partial focal zone of first partial beams having the first polarization state and a second partial focal zone of second partial beams having the second polarization state, with the result that the focal zone at least in certain portions is formed by spatial overlap of the first partial focal zone and the second partial focal zone, and the focal zone has an asymmetrical cross section in a plane oriented perpendicularly in relation to the longitudinal centre axis.

The methods according to embodiments of the invention in particular have one or more features and/or advantages of the apparatuses according to embodiments of the invention that were described above. Advantageous configurations of the methods according to embodiments of the invention have already been explained in conjunction with the apparatuses according to embodiments of the invention.

In particular, it may be provided that the workpiece is produced from and/or consists of a material which is transparent to a wavelength of the input laser beam and/or of the focal zone formed from the input laser beam. The material of the workpiece is or comprises glass, for example.

A transparent material is to be understood to mean in particular a material through which at least 70% and in particular at least 80% and in particular at least 90% of the laser energy of the machining beam is transmitted.

In particular, it may be provided that the focal zone is applied to the workpiece to carry out the laser machining, and in particular that the workpiece is moved relative to the focal zone along a machining line or machining surface. This makes it possible to form material modifications in the workpiece that are disposed along the machining line or machining surface.

In particular, it may be provided that the workpiece can be separated or is separated along a machining line and/or machining surface after the laser machining has been carried out.

It can be advantageous when the material of the workpiece can be separated or is separated along the machining line and/or machining surface by applying thermal loading and/or mechanical stress and/or by etching by means of at least one wet-chemical solution.

In particular, it may be provided that the input laser beam is a pulsed laser beam or an ultrashort pulse laser beam, and/or that the focal zone is formed by means of a pulsed laser beam or ultrashort pulse laser beam.

In particular, an axis system for moving and/or inclining the workpiece relative to the focal zone is provided.

Regulating electronics for spatially resolved pulse control, in particular comprising pulse on demand, may be provided to control a laser source for providing the input laser beam.

In particular, a workpiece mount for the workpiece, which in particular has a nonreflective and/or strongly scattering surface, is provided.

Unless stated otherwise, the aforementioned properties of the focal zone fundamentally relate to properties of the focal zone in air and/or to properties of the focal zone outside the workpiece.

In particular, the indications "approximately" and "at least approximately" are to be understood in general to mean deviations of no more than 10%. Unless stated otherwise, the indications "approximately" or "at least approximately" are to be understood to mean in particular that an actual value and/or distance and/or angle deviates by no more than 10% from an ideal value and/or distance and/or angle.

Elements that are the same or have equivalent functions are denoted by the same reference signs in all the exemplary embodiments.

A first exemplary embodiment of an apparatus for laser machining a workpiece is shown in FIG. 1 and is denoted by 10 in that figure. The apparatus 10 can be used to create material modifications that are localized on the workpiece, such as for example defects on the submicron scale or on the atomic scale, which weaken the material. This makes it possible to separate the workpiece into two different segments, for example in a subsequent step.

In particular, the apparatus 10 comprises a laser source 12 for providing an input laser beam 14. The input laser beam 14 is in particular a pulsed laser beam and/or an ultrashort pulse laser beam. For example, the input laser beam 14 is a Gaussian beam and/or has a diffractive beam profile.

The apparatus 10 comprises a beam shaping device 16, into which the input laser beam 14 can be input coupled. In particular, the input laser beam 14 is input coupled into the beam shaping device 16 in an operating state of the apparatus 10.

The input laser beam 14 propagates along a longitudinal direction z. In particular, the longitudinal direction z is to be understood to mean a main beam propagation direction of the input laser beam 14 and/or of beams formed from the input laser beam 14 through the apparatus 10.

A wavelength of the input laser beam 14 is for example 515 nm or 1030 nm.

The beam shaping device 16 imposes a phase on a beam cross section of the input laser beam 14 to generate an elongate focal zone 18. A cross-sectional direction of this beam cross section is oriented perpendicularly in relation to the longitudinal direction z and/or in relation to the beam propagation direction.

The input laser beam 14 impinges on the beam shaping device 16 on a beam entrance side 20 and is input coupled into the beam shaping device. On a beam exit side 22, which is situated opposite the beam entrance side 20, phase-modulated partial beams 24 are output coupled from the beam shaping device 16.

The partial beams 24 output coupled from the beam shaping device 16 are mutually coherent partial beams, that is to say different partial beams 24 have a fixed phase relationship with one another.

The partial beams 24 exiting the beam shaping device 16 are also inclined at a cone angle $\beta_1$ with respect to the input laser beam 14 incident on the beam shaping device 16 and/or with respect to an optical axis 25 of the beam shaping device 16. In particular, the partial beams 24 have a conical profile and/or a conical envelope.

Interference of the partial beams 24 causes the formation of an intermediate image 26, which is assigned to the focal zone 18 and disposed downstream of the beam shaping device 16 in the longitudinal direction z. The intermediate image 26 of the focal zone 18 and/or the focal zone 18 have an elongate and/or long shape.

In particular, the intermediate image 26 and/or the focal zone 18 are aligned in the longitudinal direction z. For example, a main direction of extent of the intermediate image 26 and/or of the focal zone 18 is oriented in the longitudinal direction z and/or oriented parallel to the optical axis 25.

The intermediate image 26 extends along a longitudinal centre axis 27 (indicated by the dotted line in FIG. 1). In this respect, the longitudinal centre axis 27 is in particular an axis of symmetry of the intermediate image 26 in the longitudinal direction.

The first beam shaping device 16 is in particular in the form of a diffractive optical element. For example, the first beam shaping device is in the form of an axicon-like element.

The phase profile imposed on the partial beams 24 by means of the beam shaping device 16 is in particular such that the intermediate image 26 and/or the focal zone 18 has a quasi-nondiffractive and/or Bessel-like beam profile.

Furthermore, the phase profile imposed on the partial beams 24 is such that the intermediate image 26 and/or the focal zone 18 has a curved shape. Correspondingly, the longitudinal centre axis 27 along which the intermediate image 26 extends has a curved shape.

Figure 3:
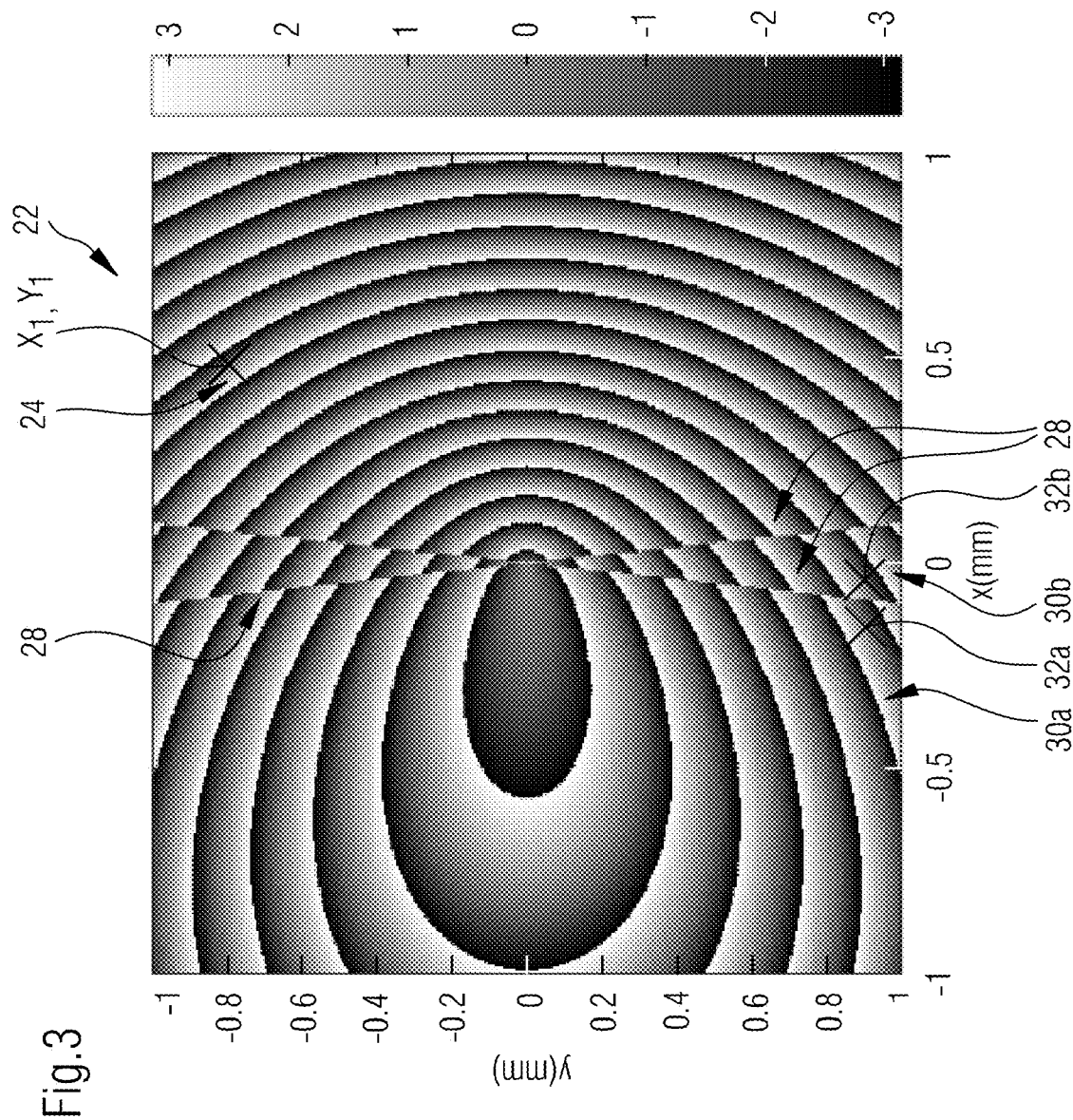
FIG. 3 shows a schematic illustration of a phase distribution of partial beams on a beam exit side of a first embodiment of a beam shaping device of the apparatus.

One example of a phase distribution imposed on the partial beams 24 by means of the beam shaping device 16 is illustrated in FIG. 3. The two-dimensional phase distribution of partial beams 24 exiting the beam shaping device 16 on the beam exit side 22 is depicted in FIG. 3 by means of a greyscale profile, with an assigned greyscale range reaching from white (phase+Pi) to black (phase−Pi).

The beam exit side 22 and/or the phase distribution that is shown are in a plane oriented transversely and in particular perpendicularly in relation to the longitudinal direction z.

Each partial beam 24 exiting the beam shaping device 16 on the beam exit side 22 at a spatial position X1, Y1 is assigned a determined phase displacement value in the range from −Pi to +Pi, which is visible in the example according to FIG. 3 with reference to the phase distribution shown there.

In the example shown in FIG. 3, the phase distribution on the beam exit side 22 has an asymmetrical and in particular not rotationally symmetrical profile. This causes imposition of a phase profile on the partial beams 24 which is such that a focal zone with a curved profile is formed by interference of the partial beams 24. As a result, the intermediate image 26 and/or the focal zone 18 has a curved profile.

Furthermore, the phase distribution shown in FIG. 3 has one or more points of discontinuity 28, at which a phase profile between two adjoining partial regions 30a, 30b is discontinuous. For example, a phase displacement and/or a phase discontinuity between the adjoining partial regions 30a, 30b has a value of Pi.

A point of discontinuity 28 is to be understood to mean a separating point and/or separating line between a first partial region 30a and a second partial region 30b adjoining the first partial region 30a.

In particular, a phase difference between a first boundary point 32a, which is on the point of discontinuity 28 in the first partial region 30a, and a second boundary point 32b, which is on the point of discontinuity 28 in the second partial region 30b, is Pi.

In particular, the adjoining partial regions 30a, 30b are each locally continuous partial regions.

Owing to the phase distribution which is discontinuous and/or provided with points of discontinuity, the phase profile imposed on the partial beams 24 by means of the beam shaping device 16 is such that the intermediate image 26 and/or the focal zone 18 has an asymmetrical beam cross section. With regard to the intermediate image 26, a cross-sectional plane of the beam cross section is oriented perpendicularly in relation to the longitudinal centre axis 27.

The apparatus 10 has a telescope device 34, which is disposed downstream of the intermediate image 26 in the beam propagation direction and/or longitudinal direction z. The focal zone 18 is formed by this telescope device 34 imaging the intermediate image 26, with the telescope device 34 in particular performing the imaging with a reduction in size.

The telescope device 34 has a first lens element 36 and a second lens element 38 which is spaced apart from the first lens element 36 in the longitudinal direction z.

The first lens element 36 is a long focal length lens element and/or an input lens element of the telescope device 34. The second lens element 38 is an output lens element and/or short focal length lens element of the telescope device 34. The second lens element 38 is in particular in the form of an objective lens and/or has the function of an objective lens.

The first lens element 36 and/or the second lens element 38 are not necessarily formed in one piece. In particular, it can be provided that the first lens element 36 and/or the second lens element 38 in each case is formed from multiple optical components or comprises multiple optical components.

A first focal length $f_1$ of the first lens element 36 is greater than a second focal length $f_2$ of the second lens element 38. In particular, a ratio $f_1/f_2$ is at least 5 and/or at most 50.

The telescope device 34 makes it possible to irradiate and/or image the focal zone 18 into a workpiece that is to be machined. In particular, the telescope device 34 makes it possible to adapt spatial dimensions of the focal zone 18 to machine the workpiece.

In particular, the focal zone 18 is to be understood to mean a focussed region which has an at least approximately constant intensity and extends along a longitudinal centre axis 40 (indicated by the dotted line in FIG. 1). In this respect, the longitudinal centre axis 40 is in particular an axis of symmetry of the focal zone 18 in the longitudinal direction.

In particular, the focal zone 18 has a focussed region which extends along the longitudinal centre axis 40 and has an at least approximately constant intensity.

In particular, the focal zone 18 has a spatially contiguous design, that is to say that the focussed intensity region of the focal zone 18 in each case has a spatially contiguous design.

However, it is in principle also possible for an intensity of the focal zone 18 to vary along the longitudinal centre axis and/or to be zero at isolated points.

In particular, the focal zone 18 is to be understood to mean a focussed region within which an intensity of laser radiation is at least great enough that, when the focal zone 18 is applied to a material of the workpiece, modified regions are created within the material. In particular, the material can be separated at these modified regions.

The longitudinal centre axis 40 of the focal zone 18 has a shape which is curved at least in certain portions and/or continuously.

Figure 4:
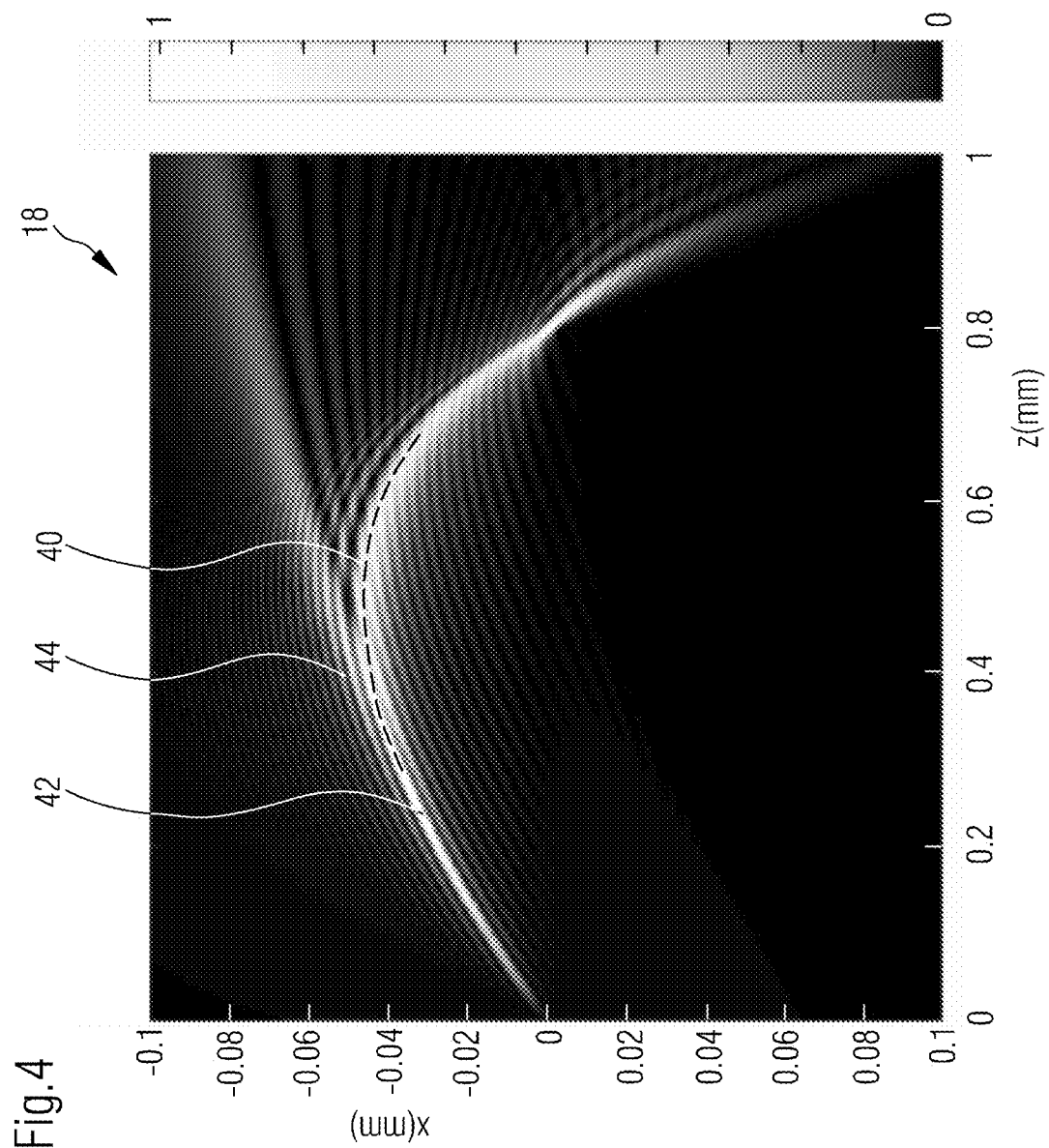
FIG. 4 shows a simulated intensity distribution of a focal zone with a curved profile in an z-x plane oriented parallel to a longitudinal centre axis of the focal zone.

One exemplary embodiment of the focal zone 18 is shown in FIG. 4, which illustrates an intensity distribution in a z-x plane oriented parallel to the longitudinal centre axis 40. Lighter greyscale values stand for greater intensities. In the exemplary embodiment according to FIG. 4, the focal zone 18 has an arc shape and/or C shape.

The focal zone 18 is in particular to be understood to mean an overall maximum intensity distribution 42, which in particular has a spatially contiguous design. In particular, only this overall maximum intensity distribution 42 is relevant for an interaction with the material that is to be machined for the purpose of forming modifications.

The maximum intensity distribution 42 is in particular surrounded by secondary intensity distributions 44. These secondary intensity distributions 44 are in particular disposed around the maximum intensity distribution 42 and/or spaced apart from the maximum intensity distribution 42. The secondary intensity distributions 44 are or comprise in particular secondary maxima.

In particular, the secondary intensity distributions 44 are insignificant for the laser machining of the workpiece, since owing to the lower intensities there is no and/or negligible formation of modifications in the material of the workpiece.

Figure 5:
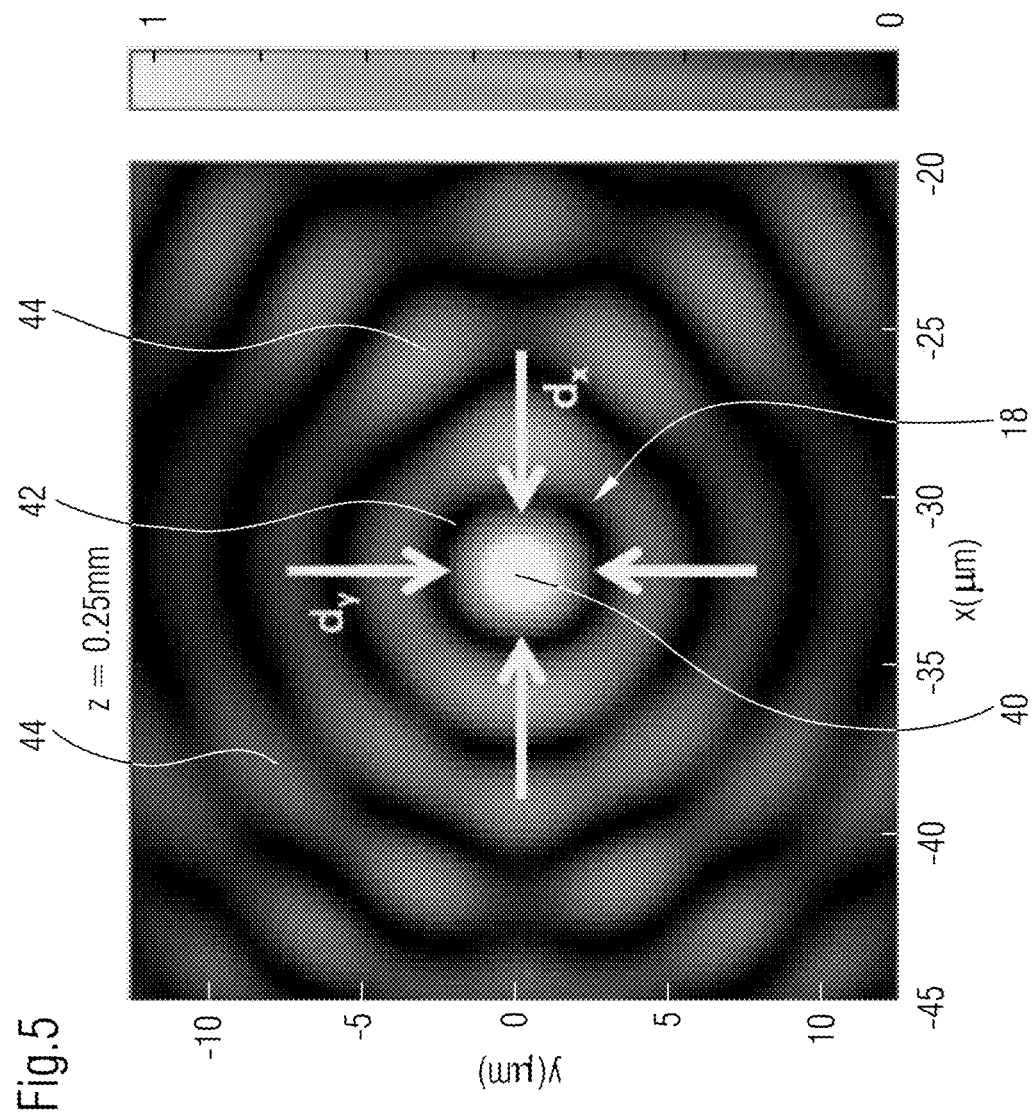
FIG. 5 shows a simulated cross-sectional illustration of an intensity distribution of a focal zone in an x-y plane oriented perpendicularly in relation to a longitudinal centre axis of the focal zone.

The focal zone 18 has an asymmetrical beam cross section, with a cross-sectional direction oriented perpendicularly in relation to the longitudinal centre axis 40. FIG. 5 shows an example of the focal zone 18 in an x-y plane oriented perpendicularly in relation to the longitudinal centre axis 40.

In particular, the focal zone 18 has a diameter $d_x$ in an x direction and a diameter $d_y$ in a y direction oriented perpendicularly in relation to the x direction, with the x direction and the y direction being in a plane oriented perpendicularly in relation to the longitudinal centre axis 40.

In particular, it may be provided that the focal zone 18 has an elliptical beam cross section. In this case, $d_x$ and $d_y$ are different. For example, $d_x$ is oriented parallel to a semi-major axis of an assigned ellipse and $d_y$ is oriented parallel to a semi-minor axis.

In a second variant of the apparatus 10, by contrast to the first variant described above, a beam shaping device 16' is used to form an intermediate image 26', which is assigned to the focal zone 18 and has an at least approximately symmetrical beam cross section.

The beam shaping device 16' and the intermediate image 26' in particular have one or more features and/or advantages of the beam shaping device 16 described above and the intermediate image 26 described above, respectively.

The intermediate image 26' extends along the longitudinal centre axis 27 and in particular has a quasi-nondiffractive and/or Bessel-like beam profile.

On the beam exit side 22, partial beams 24 exiting the beam shaping device 16' have a different phase distribution than in the case of the beam shaping device 16 described above.

Figure 6:
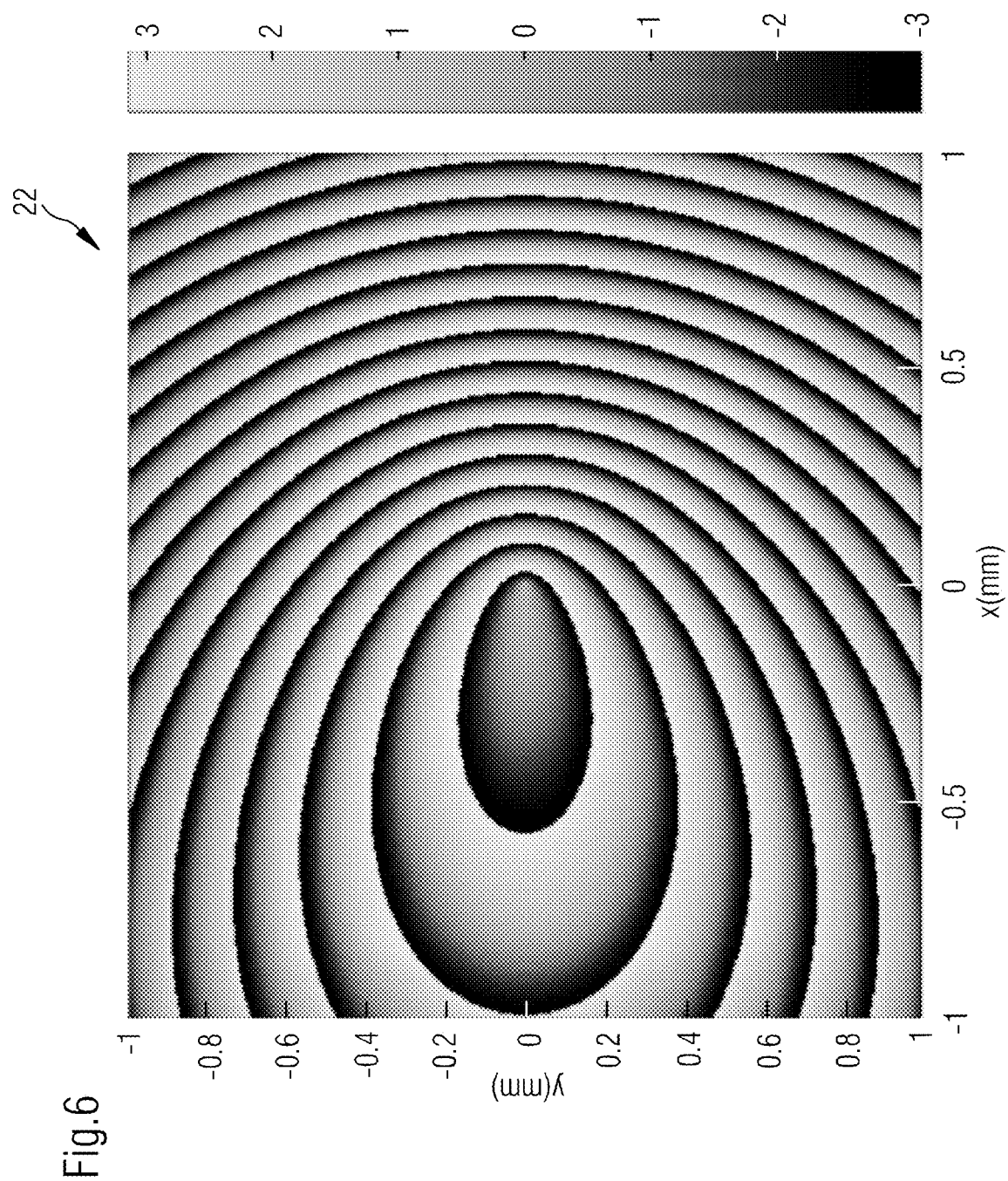
FIG. 6 shows a schematic illustration of a phase distribution of partial beams on a beam exit side of a further embodiment of a beam shaping device of the apparatus.

One example of a phase distribution imposed on the partial beams 24 by means of the beam shaping device 16' is illustrated in FIG. 6 in the form of a greyscale distribution (similarly to FIG. 3). The phase distribution on the beam exit side 22 has an asymmetrical and in particular non-rotationally symmetrical profile. This causes imposition of a phase profile on the partial beams 24 which is such that a focal zone with a curved profile is formed by interference of the partial beams 24. As a result, the intermediate image 26' and/or the focal zone 18 has a curved profile.

In particular, the phase distribution shown in FIG. 6 is continuous, and in particular continuous overall. In particular, the phase distribution shown in FIG. 6 does not have any break points and/or points of discontinuity. This causes imposition of a phase profile on the partial beams 24 which is such that a focal zone with a symmetrical beam cross section is formed by interference of the partial beams 24. As a result, the intermediate image 26' has a symmetrical beam cross section, with a cross-sectional direction being oriented perpendicularly in relation to the longitudinal centre axis 27.

To realize the asymmetric beam cross section of the focal zone 18, the apparatus 10 in this second variant comprises a beam splitting device 46 (indicated by the dashed line in FIG. 1), which is assigned to the telescope device 34. For example, the beam splitting device 46 is part of the telescope device 34 and/or disposed in a beam path of the telescope device 34. For example, the beam splitting device 46 is or comprises a polarization beam splitter optical unit.

The beam splitting device 46 is in particular disposed in a far field region 48 and/or in a focal plane 50 of the telescope device 34. For example, the focal plane 50 is a focal plane of the first lens element 36 and/or of the second lens element 38.

Partial beams 24 output coupled from the beam shaping device 16' and/or beams originating from the intermediate image 26' impinge on the beam splitting device 46 as incident beams 52. These incident beams 52 are each split into different partial beams 54a, 54b having different polarization states by means of the beam splitting device 46.

In the example of the beam splitting device 46 shown in FIG. 7, incident beams 52 are each split into first partial beams 54a having a first polarization state and second partial beams 54b having a second polarization state by means of the beam splitting device 56.

The first polarization state and the second polarization state are in particular polarization states oriented perpendicularly in relation to one another and/or linear polarization states. In particular, the first partial beams 54a and the second partial beams 54b are polarized in such a way that an electrical field lies in a plane perpendicularly in relation to the longitudinal direction z and/or beam propagation direction (transverse electric).

The first partial beams 54a have a spatial offset Δx and an angular offset Δα in relation to the second partial beams 54b.

In particular, the first partial beams 54a are oriented at least approximately parallel to an optical axis 56 of the telescope device 34, with the optical axis 56 for example being oriented parallel to the optical axis 25 of the beam shaping device 16, 16' or coinciding therewith.

The first partial beams 54a output coupled from the beam splitting device 46 are imaged into a first partial focal zone 58a by means of the telescope device 34 and/or by means of the second lens element 38. Correspondingly, the second partial beams 54b output coupled from the beam splitting device 46 are imaged into a second partial focal zone 58b by means of the telescope device 34 and/or by means of the second lens element 38 (FIGS. 9a and 9b).

Owing to the angular offset of the first partial beams 54a and the second partial beams 54b, the result, after the focussing by means of the telescope device 34, is a spatial offset Δb between the first partial focal zone 58a and the second partial focal zone 58b in a direction oriented perpendicularly in relation to the longitudinal centre axis 40.

The first partial focal zone 58a extends along a first longitudinal centre axis 60a and the second partial focal zone 58b extends along a second longitudinal centre axis 60b. The first longitudinal centre axis 60a and the second longitudinal centre axis 60b extend in the longitudinal direction z and/or in the beam propagation direction.

In particular, the first partial focal zone 58a and the second partial focal zone 58b each at least approximately have a symmetrical beam cross section, with a cross-sectional direction being oriented perpendicularly in relation to the first longitudinal centre axis 60a and the second longitudinal centre axis 60b, respectively.

The focal zone 18 is formed by at least partial spatial overlap and/or superposition of the first partial focal zone 58a and the second partial focal zone 58b. A beam cross section of the focal zone 18 formed thereby is asymmetrical and in particular elliptical (cf. FIGS. 9a and 9b).

The first partial beams 54a and the second partial beams 54b are mutually incoherent partial beams and/or do not have a fixed phase relationship with one another, and therefore the first partial beams 54a and the second partial beams 54b in particular do not interfere with one another. In the event of a spatial overlap of the first partial beams 54a and the second partial beams 54b, the result is therefore an addition of respective intensities of the first partial beams 54a and of the second partial beams 54b.

In the example shown in FIGS. 9a and 9b, the first longitudinal centre axis 60a is oriented at least approximately parallel to the second longitudinal centre axis 60b. The longitudinal centre axis 40 of the focal zone 18 is symmetrical and/or in the centre with respect to the first longitudinal centre axis 60a and the second longitudinal centre axis 60b.

In the example shown in FIG. 7, the beam splitting device 46 comprises a birefringent polarizer element 62. Both a spatial offset Δx and an angular offset Δα are created between the first partial beams 54a and the second partial beams 54b by means of the birefringent polarizer element 62.

A beam entrance side 64 and/or beam entrance surface of the beam splitting device 46 is formed on this birefringent polarizer element 62.

An optical axis 66 of the birefringent polarizer element 62 is oriented for example at an angle of 45° in relation to the beam entrance side 64 and/or in relation to the optical axis 56 of the telescope device 34.

The beam splitting device 46 also comprises an isotropic element 68, which is disposed downstream of the birefringent polarizer element 62 in the longitudinal direction z. The first partial beams 54a are aligned parallel to the optical axis 56 by means of this isotropic element 68.

The birefringent polarizer element 62 and/or the isotropic element 68 for example has a wedge-shaped design.

A further embodiment, shown in FIG. 8, differs from the embodiment according to FIG. 7 essentially in that the first partial beams 54a are oriented parallel to the optical axis 56 of the telescope device 34 and lie in this optical axis 56.

For the parallel alignment of first partial beams 54a in relation to the optical axis 56 and their positioning on the optical axis 56, the embodiment according to FIG. 8 comprises two birefringent polarizer elements 62 disposed one behind the other.

In all other respects, the embodiment according to FIG. 8 fundamentally has the same structure and/or the same mode of operation as the embodiment according to FIG. 7, and therefore reference is made to the above description thereof in this respect.

In terms of the mode of operation and design of the beam splitting device 46, reference is made to the German patent application with the reference number 10 2020 207 715.0 (filing date: 22 Jun. 2020), from the same applicant. Express reference is made to the entire content of this document.

Figure 2:
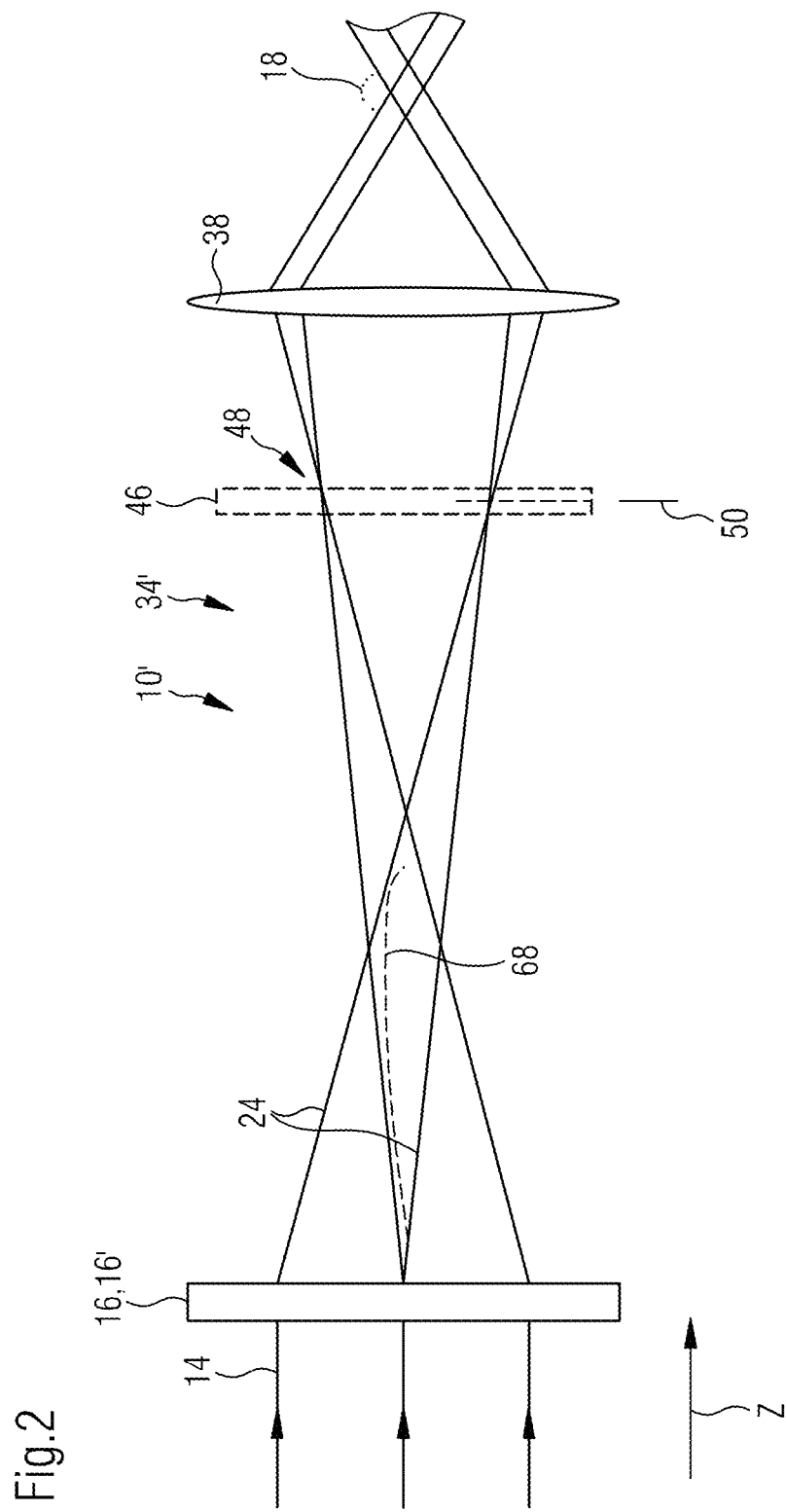
FIG. 2 shows a schematic sectional illustration of a partial region of a further embodiment of an apparatus for laser machining a workpiece, with two different variants being indicated.

A further embodiment of an apparatus 10' for laser machining a workpiece (FIG. 2) differs from the embodiments described above essentially in that an alternative variant of a telescope device 34' is provided.

In the case of the telescope device 34', the first lens element 36 is integrated in the beam shaping device 16, 16' or disposed on the beam exit side 22 of the beam shaping device. This makes it possible for the apparatus 10' in particular to have a compact configuration and/or a configuration with a reduced number of individual components.

For example, a functionality of the first lens element 36 is integrated in the beam shaping device 16, 16'.

An intermediate image 68 which is formed in the case of the apparatus 10' and is assigned to the focal zone 18 does not necessarily have the properties of the intermediate image 26, 26' that was described above. Compared to the intermediate image 26, 26', the intermediate image 68 has a different form owing to the beam profile, which is modified in the present case. In particular, the intermediate image 68 has a different shape compared to the intermediate image 26, 26' and/or to the focal zone 18.

In all other respects, the apparatus 10' fundamentally has the same structure and the same mode of operation as the variants of the apparatuses 10 that were described above, and therefore reference is made to the description thereof in this respect.

To determine a length l of the focal zone 18 in the direction of the longitudinal centre axis 40 and/or a diameter $d_x$, $d_y$ in an x direction and y direction, respectively, oriented perpendicularly in relation to the longitudinal centre axis 28, consideration is given to a modified intensity distribution which only has intensity values that are above a determined intensity threshold, wherein the intensity threshold is in particular 50% of an overall intensity maximum of the actual intensity distribution. This is schematically illustrated in FIGS. 10a, 10b and 10c for the diameter $d_x$, $d_y$ of the focal zone 18.

The length l of the focal zone 18 is to be understood for example to mean a maximum length of extent and/or a length of maximum extent of the focal zone 18 along the longitudinal centre axis 40, taken on the basis of the modified intensity distribution. In the example shown in FIG. 9a, the length l is for example a corresponding curve length and/or arc length and/or circular arc length of the focal zone 18.

It may be provided that the apparatus 10 comprises a further telescope device 69 which is disposed between the laser source 12 and the beam shaping device 16, 16' in the longitudinal direction z. This further telescope device 42 can be used to control and/or regulate a diameter $d_0$ of the input laser beam 14 that is incident on the beam shaping device 16, 16'.

By controlling and/or regulating the diameter $d_0$, it is possible to control and/or regulate a length l of the focal zone and/or a length of the intermediate image 26, 26' of the focal zone 18. The length l increases as the diameter $d_o$ increases.

The apparatus 10, 10' according to embodiments of the invention operates as follows:

To carry out a machining operation on a workpiece 70 by means of the apparatus 10, 10', the focal zone 18 is applied to a material 72 of the workpiece 70 and the focal zone 18 is moved relative to the material 72.

In particular, the material 72 is a material which is transparent or partially transparent to a wavelength of the input laser beam 14 and/or of the focal zone 18 formed from the input laser beam 14. For example, the material 72 is a glass material.

Figure 12B:
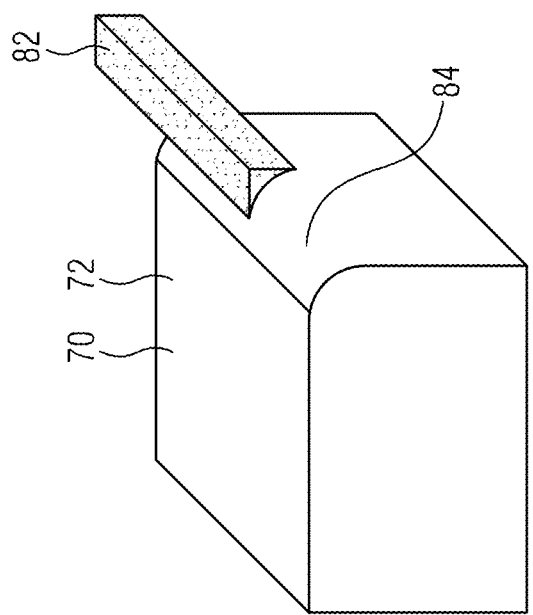
FIG. 12b shows a perspective illustration of a further example of a workpiece which is separated into two different segments along a machining line and/or machining surface.
Figure 12A:
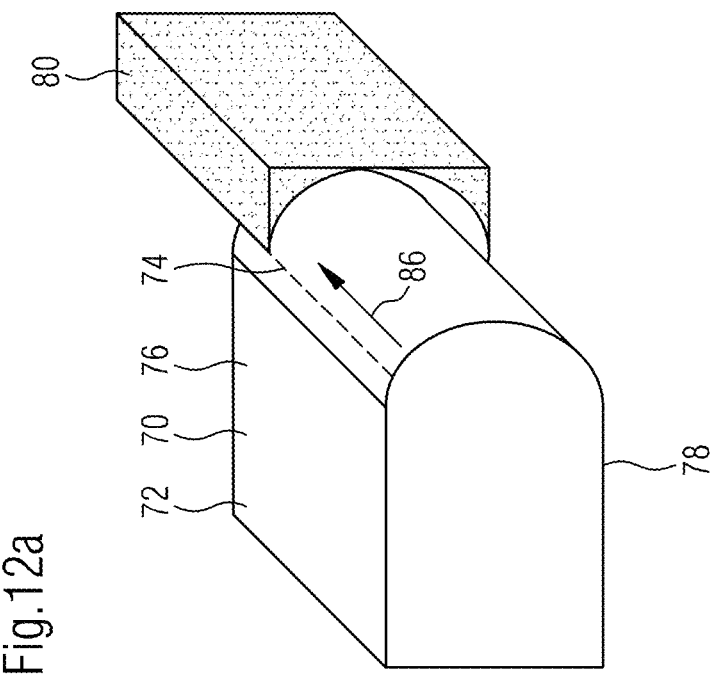
FIG. 12 a shows a perspective illustration of an example of a workpiece which is separated into two different segments along a machining line and/or machining surface.

The focal zone 18 is in particular moved along a predefined machining line 74 and/or machining surface (FIGS. 11, 12*a* and 12*b*). The machining line 74 may for example have straight and/or curved portions.

By applying the focal zone 18 to the material 72, localized material modifications, which reduce the strength of the material 72 on the machining line 74 and/or machining surface, are formed on this material 72 on the machining line 74 and/or machining surface.

This makes it possible to separate the material 72 into two different segments after the material modifications have been formed on the machining line 74 and/or machining surface, for example by applying a mechanical force.

FIGS. 11, 12*a* and 12*b* show for example the machining of the material 72 by means of a first variant of a focal zone 18*a*, which extends from a first outer side 74 to a second outer side 76 situated opposite the first outer side 74, wherein the first outer side 74 is spaced apart from the second outer side 76 by a material thickness D of the material 72. In the example shown, the first focal zone 18*a* extends at least over the entire material thickness D. This makes it possible for example to separate a segment 80 extending over the entire material thickness D from the material 72.

A second variant of a focal zone 18*b* extends through the material 72 in certain portions. This makes it possible for example to separate a segment 82 having a quarter circle profile from the material 72 (FIG. 12*b*). The focal zone 18*b* makes it possible for example to round an edge 84 of the material 72.

An advancement direction 86 of the focal zone 18 relative to the material 72 is oriented parallel to the machining line 74.

FIG. 13 shows multiple modification regions 88 which are formed by a relative movement of the focal zone 18 in relation to the material 72. In particular, the cross section of the focal zone 18 is aligned such that a longer axis of the cross section is oriented at least approximately parallel to the advancement direction 86 and/or that a short axis of the cross section is oriented transversely and in particular perpendicularly in relation to the advancement direction 86.

In the example shown in FIG. 13, the focal zone 18 has an elliptical cross section. A greater half-axis and/or a greater diameter $d_y$ is oriented at least approximately parallel to the advancement direction 86.

This makes it possible to form cracks 90 between adjoining modification regions 88 in particular in controlled fashion, as a result of which it is possible to realize optimum separation of the material 72.

The cracks 90 are in particular aligned at least approximately parallel to a shortest connection line between adjoining modification regions 88.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS $\beta_1$ Cone angle
$\Delta x$ Spatial offset
$\Delta b$ Spatial offset
$\Delta \alpha$ Angular offset
$d_x$ Diameter in the x direction
$d_y$ Diameter in the y direction
$d_0$ Diameter
D Material thickness
l Length
z Longitudinal direction
10, 10' Apparatus
12 Laser source
14 Input laser beam
16, 16' Beam shaping device
18 Focal zone
18*a*, 18*b* Focal zone
20 Beam entrance side
22 Beam exit side
24 Partial beams
25 Optical axis
26, 26' Intermediate image
27 Longitudinal centre axis
28 Point of discontinuity
30*a* First partial region
30*b* Second partial region
32*a* First boundary point
32*b* Second boundary point
34, 34' Telescope device
36 First lens element
38 Second lens element
40 Longitudinal centre axis
42 Overall maximum intensity distribution
44 Secondary intensity distribution
46 Beam splitting device
48 Far field region
50 Focal plane
52 Incident beams
54*a* First partial beam
54*b* Second partial beam
56 Optical axis
58*a* First partial focal zone
58*b* Second partial focal zone 60a First longitudinal centre axis
60b Second longitudinal centre axis
62 Birefringent polarizer element
64 Beam entrance side
66 Optical axis
68 Intermediate image
69 Further telescope device
70 Workpiece
72 Material
74 Machining line
76 First outer side
78 Second outer side
80 Segment
82 Segment
84 Edge
86 Advancement direction
88 Modification region
90 Crack

The invention claimed is:

1. An apparatus for laser machining a workpiece, comprising a beam shaper for forming a focal zone from an input laser beam incident on the beam shaper, and a telescope for imaging the focal zone into a material of the workpiece, wherein the beam shaper is configured to impose a phase on a beam cross section of the input laser beam in such a way that the focal zone extends along a longitudinal centre axis which is curved at least in certain portions, wherein the telescope comprises a beam splitter for splitting an output laser beam output coupled from the beam shaper into a plurality of polarized partial beams, each of which has one of at least two different polarization states, wherein the telescope with the beam splitter is designed to focus the plurality of polarized partial beams into a first partial focal zone of first partial beams having a first polarization state and a second partial focal zone of second partial beams having a second polarization state, so that the focal zone at least in certain portions is formed by a spatial overlap of the first partial focal zone and the second partial focal zone, and the focal zone has an asymmetrical cross section in a plane oriented perpendicular to the longitudinal centre axis, wherein the beam splitter comprises a first birefringent polarizer element, so that both a spatial offset and an angular offset are created between the first partial beams and the second partial beams output coupled from the beam splitter, wherein the first partial beams output coupled from the beam splitter are oriented parallel to an optical axis of the telescope.

2. The apparatus according to claim 1, wherein the first partial focal zone extends along a first longitudinal centre axis and the second partial focal zone extends along a second longitudinal centre axis, wherein the first longitudinal centre axis and the second longitudinal centre axis each have a curved shape at least in certain portions, and wherein the first longitudinal centre axis and the second longitudinal centre axis have a spatial offset in a direction oriented perpendicularly in relation to the first longitudinal centre axis and the second longitudinal centre axis.

3. The apparatus according to claim 1, wherein the first partial beams and the second partial beams are incoherent in relation to one another, and the first partial beams and the second partial beams do not have a fixed phase relationship with one another.

4. The apparatus according to claim 1, wherein the beam splitter is disposed in a far field region of the telescope.

5. The apparatus according to claim 1, wherein the beam splitter comprises a polarization beam splitter.

6. The apparatus according to claim 1, wherein the beam splitter is configured to split incident beams into respective different partial beams having different polarization states, wherein the partial beams that are output coupled from the beam splitter and have different polarization states have an angular offset with respect to each other.

7. The apparatus according to claim 1, wherein the longitudinal centre axis of the focal zone at least in certain portions has a radius of curvature of at least 50 µm and at most 100 mm, and the longitudinal centre axis of the focal zone has an average radius of curvature of at least 200 µm and at most 2 mm, and the focal zone has a length of at least 50 µm and at most 20 mm.

8. The apparatus according to claim 1, wherein the focal zone has a quasi-nondiffractive beam profile.

9. The apparatus according to claim 1, wherein the focal zone has an elliptical cross section in a plane oriented perpendicular to the longitudinal centre axis of the focal zone, and wherein a greatest diameter of the elliptical cross section of the focal zone is aligned at least approximately parallel to an advancement direction, in which the workpiece is moved relative to the focal zone to form a machining line or a machining surface.

10. The apparatus according to claim 1, further comprising a laser source for providing the input laser beam, wherein the input laser beam is a pulsed laser beam.

11. The apparatus according to claim 1, wherein a phase distribution of the partial beams output coupled on a beam exit side of the beam shaper is asymmetrical.

12. The apparatus according to claim 1, wherein the beam splitter is arranged approximately in a focal plane of the telescope.

13. The apparatus according to claim 1, wherein the beam splitter further comprises a second birefringent polarizer element disposed behind the first birefringent polarizer element along an optical path.

14. The apparatus according to claim 13, wherein the first birefringent polarizer element and the second birefringent polarizer element are birefringent wedge elements.

15. The apparatus according to claim 1, wherein the focal zone has a Bessel-like beam profile.

16. The apparatus according to claim 1, wherein a phase distribution of the partial beams output coupled on a beam exit side of the beam shaper is not rotationally symmetrical.

17. The apparatus according to claim 1, wherein the first birefringent polarizer element is a birefringent wedge element.

18. A method for laser machining a workpiece, the method comprising:
  forming, using a beam shaper, a focal zone from an input laser beam incident on the beam shaper,
  imaging the focal zone into a material of the workpiece using a telescope, wherein the beam shaper is configured to impose a phase on a beam cross section of the input laser beam in such a way that the focal zone extends along a longitudinal centre axis which is curved at least in certain portions, and
  splitting, using a beam splitter in the telescope, an output laser beam output coupled from the beam shaper into a plurality of polarized partial beams, each of the plurality of polarized partial beams has one of at least two different polarization states, wherein the plurality of polarized partial beams are focused into a first partial focal zone of first partial beams having a first polarization state and a second partial focal zone of second partial beams having a second polarization state, so that the focal zone at least in certain portions is formed by a spatial overlap of the first partial focal zone and the second partial focal zone, and the focal zone has an asymmetrical cross section in a plane oriented perpendicular to the longitudinal centre axis, wherein the beam splitter comprises a birefringent polarizer, so that both a spatial offset and an angular offset are created between the first partial beams and the second partial beams output coupled from the beam splitter, wherein the first partial beams output coupled from the beam splitter are oriented parallel to an optical axis of the telescope.

* * * * *